(12) United States Patent
Marsland

(10) Patent No.: US 9,288,998 B2
(45) Date of Patent: *Mar. 22, 2016

(54) EDIBLE NUTRITIVE COMPOSITE

(75) Inventor: Charles H. Marsland, Long Island City, NY (US)

(73) Assignee: Medwell Foods, Inc., Maspeth, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/754,019

(22) Filed: Apr. 5, 2010

(65) Prior Publication Data

US 2010/0189864 A1  Jul. 29, 2010

Related U.S. Application Data

(63) Continuation-in-part of application No. 10/288,854, filed on Nov. 6, 2002, now Pat. No. 7,691,430.

(51) Int. Cl.
| | |
|---|---|
| *A23J 3/18* | (2006.01) |
| *A21D 2/26* | (2006.01) |
| *A21D 13/06* | (2006.01) |
| *A23L 1/164* | (2006.01) |
| *A23L 1/217* | (2006.01) |
| *A23L 1/29* | (2006.01) |
| *A23L 1/305* | (2006.01) |
| *A23L 1/314* | (2006.01) |

(52) U.S. Cl.
CPC ............. *A21D 2/265* (2013.01); *A21D 2/263* (2013.01); *A21D 2/266* (2013.01); *A21D 13/06* (2013.01); *A21D 13/064* (2013.01); *A23L 1/164* (2013.01); *A23L 1/1645* (2013.01); *A23L 1/2175* (2013.01); *A23L 1/296* (2013.01); *A23L 1/3053* (2013.01); *A23L 1/3055* (2013.01); *A23L 1/31436* (2013.01); *A23V 2002/00* (2013.01)

(58) Field of Classification Search
USPC .................... 426/656, 549, 496, 804
See application file for complete search history.

(56) References Cited

U.S. PATENT DOCUMENTS

| | | | |
|---|---|---|---|
| 4,759,934 A | 7/1988 | Ferrara | |
| 4,966,778 A * | 10/1990 | Benjamin et al. | ............... 426/19 |
| 5,320,859 A | 6/1994 | Namdari | |
| 5,977,312 A | 11/1999 | Bassi et al. | |
| 6,569,483 B2 * | 5/2003 | Zohoungbogbo | ............. 426/549 |
| 2003/0091698 A1 | 5/2003 | Marsland | |
| 2007/0014914 A1 * | 1/2007 | Borders | ................. A23G 3/343 |
| | | | 426/656 |

OTHER PUBLICATIONS

International Search Report issued in corresponding PCT application No. PCT/US11/31176 mailed May 27, 2011.

* cited by examiner

*Primary Examiner* — Lien T Tran
(74) *Attorney, Agent, or Firm* — Brian M. Dingman; Dingman, McInnes & McLane, LLP

(57) ABSTRACT

A nutritive edible composite food product that includes a protein-containing material, a carbohydrate-containing material, a fat or fat-containing material, and a source of liquid. The materials are mixed together to form an extensible nutritive edible composite material possessing an average extensibility of at least about 100%, such that the composite material is capable of being processed by extrusion, sheeting or molding operations that require extensibility. The composite material is further processed, to create a food product comprising at least about 15% protein.

16 Claims, No Drawings

EDIBLE NUTRITIVE COMPOSITE

CROSS-REFERENCE TO RELATED APPLICATION

This application is a continuation in part of application Ser. No. 10/288,854 filed on Nov. 6, 2002 Now U.S. Pat. No. 7,691,430, entitled "Novel Food Material Technology with Controllable Functional Characteristics and Industrial Process Applications, and the Resulting Fabricated Foods." Priority is claimed. The entire contents of this prior application are incorporated by reference herein.

FIELD

The invention relates to edible nutritive composite materials where the material has controllable functional characteristics including nutrient value and extensibility.

BACKGROUND

Many finished edible composite products, including but not limited to snacks, crackers, chips, flat breads, tortillas, biscuits, breads, bagels, rolls, pasta, pastries, cereals, pizza, croutons, pretzels, and doughnuts, have developed/evolved over time with a focus on carbohydrate-based material formulations. This focus on carbohydrates (including but not limited to flour, sugar, starch, and derivatives of such) has had a major all-around impact ranging from consumer health and wellness, taste and texture profiles of foods, to the actual manufacturing equipment and process design for such. All are deeply engrained.

To highlight this, equipment materials of construction, engineering design, material handling requirements and systems, process design, recipe creation and product formulation have all developed around these carbohydrate-based products, ingredients, and their processing material characteristics. This leaves all commercial and industrial processes with fixed parameters that require very specific material characteristics (e.g. extensibility) to operate correctly. Without such, there is no finished product.

These carbohydrate-based products have also made a permanent impact on both the conscious and unconscious mind of the consumer regarding taste, texture, and mouth-feel. All are critical for the consumption of food in today's industrialized world. Unfortunately, this same focus on carbohydrate-based foods has also had other unwanted consequences, including an out-of-control increase in human obesity, gastrointestinal health issues (e.g. Irritable Bowel Syndrome), diabetes, and inflammatory diseases. All are directly linked to the excessive proliferation of these inexpensive high-carbohydrate composite foods utilized by the industrialized world population.

As a result, the need for change has become critical for the general public's long-term health and wellness. The difficulty with enacting the necessary "medical wellness" product formulation changes is that simply a change in food ingredients is not an easy matter, nor is it easy to simply substitute of one ingredient for another. Foods must still be palatable, desirable, and digestible. The products must also be capable of being processed on existing manufacturing equipment, ranging from small-scale apparatus and appliances to large industrial-scale equipment. Therefore this nutritive formulation and material technology combination must meet the requirements of the equipment and deliver a food product with taste, texture and mouth-feel characteristics similar to existing carbohydrate-based food products.

Any new food material technology would thus need to be multifunctional, requiring it to both process and taste similar to carbohydrates. Also, in order to be processed, such nutritive composites would need to emulate the material characteristics exhibited by high-carbohydrate composites, including possessing controllable extensibility needed to be processable in common food manufacturing processes, including direct reduction sheeting, lamination sheeting, extrusion, mixing, blending, forming, various molding processes, baking, drying, frying, steaming, retort, high temperature liquid boiling, and more. The processed nutritive composite materials need to be able to withstand being physically subjected to equipment handling, various extrusion techniques, molding processes, and thickness reduction methods on automated process equipment. Standard carbohydrate materials technology, used for these common processes, has been mastered over centuries of engineering, work, and effort. Therefore, these processes and the equipment have been designed for processing of high-carbohydrate materials. There is thus a great need for a material base change in which will yield good tasting, economical, carbohydrate-like nutritive composite.

SUMMARY

The invention relates generally to nutritive composite materials and edible products (foods) made with such materials. The material has controllable nutritive properties, engineered process-related functionality, including extensibility, and can handle all the final processing and material handling including but not limited to direct reduction sheeting, lamination sheeting, extrusion, molding, forming, rounding, cutting, baking, drying, boiling, steaming, frying, seasoning, enrobing, and/or a combination of such. The final fabricated composite product mimics a high-carbohydrate product such as bagels, breads, rolls, flat breads, pastries, pizza crust, pretzels, croutons, chips, snacks, pasta, cereals, croissants, and doughnuts, for example.

This nutritive material technology is based on the utilization of a combination of proteinacious materials, select carbohydrates, a liquid source, fats, and if required, optional yeast, minerals, herbs, extracts, bioproducts, tinctures, chemical compounds, vitamins, leavening agents, flavors and toppings. When mixed with water or other water-based liquids, the dry nutritive composite blend will form a composite material. This composite material's functionality is controllable and based on desired characteristics that are all process and end product property driven. The relative amount of specific ingredients imparts the controllable functional characteristics, useful both for processing and in the final product. These controllable functional characteristics include extensibility, molded form retention, water absorption, tensile strength, volume and formation, cut and release, texture, and more. The complexity stems from knowing what functionality, in a mixture chemistry equation, that the nutritive ingredients impart in the raw state, manufacturing process, and final finished edible product. The control of these functional characteristics is critical to both manufacturing and consumer appeal.

The nutrient value of the composite introduces great difficulty for unlike traditional carbohydrate based composites, the functional material characteristics such as the extensibility value of such high nutrient value ingredients is different than what is required for low nutrient value carbohydrate processing systems. However, with this invention, co-ingredient interaction and functionality is designed into the product for intended results for nutrient value and extensibility.

This allows for greater nutrient value with different carbohydrate-like characteristics. The data set forth below demonstrates a range of functional control of extensibility by variation of the amount and kind of nutritive ingredients.

Examples of nutritive protein-containing ingredients includes non-viscoelastic modified wheat protein isolate, gliadin, glutenen, soy protein isolate, whey protein isolate, milk protein isolate, calcium caseinate, sodium caseinate, soy protein concentrate, textured wheat protein, textured vegetable protein, whey protein concentrate, rice protein concentrate, egg protein, zein, wheat protein concentrate, denatured proteins, gluten, oil seed proteins, hydrolyzed proteins, cheese (all variations), meat analogs, textured proteins, fish protein, amino acids, peptides, collagen, casein, animal and bird (fowl) protein, single cell protein, nuts, and other raw materials having a protein content of greater than about 20%. Examples of fats that can be used in the invention include vegetable oils, legume oils, butter, cheese curds, natural cheese, process cheese, nut oils, shortening, animal fats, fish oils, bird fats, fruit fats, or other materials with a percent fat greater than 20% measured on a dry basis, or other materials with a percent fat greater than 33% measured on a dry basis. Examples of carbohydrates that can be used in the invention include, but are not limited to, fiber, gums, starches, pregelatinized starches, crystalline starches, chocolate, cocoa compounds and powders, powdered flavors, spices, herbs, texturizing agents, beta glucan-based materials, corn masa, potato material, grains, fruit products, legumes, legume flours, seed meal, seeds, vegetable matter, and other CHO compounds. Other proteins and fats could also be used. Additional nutritive ingredients that can be utilized include yeast, vitamins, minerals, herbal extracts and concentrates, probiotics, prebiotics, dietary supplements, herbs, flower components, and ingredients containing polyphenols. The above are preferred, because they are widely available commercially, and also contribute to the products' nutritive profile and functionality.

In one aspect, the invention comprises in general the following: mixing of the proteinaceous material(s), fat(s), carbohydrate(s), and liquid(s), and optionally additional nutritive micro ingredients and/or herbs and/or dietary supplements and/or probiotics and/or prebiotics and/or minerals and/or yeast and/or extracts and/or flavors and/or sweeteners and/or enhancers and/or colors and/or alcohol and/or tinctures in a mixing vessel or extruder to form a soft, extensible, non-sticky composite. The composite may then be transferred to a fermentation system or proofing system and/or molding system and/or extruder and/or temperature controlled-monitored system. Once this phase is complete (if opted for), the product is formed or molded into desired shape and size via sheeting, lamination sheeting, molding process, extrusion, pressing, rounding, forming or a process necessary to achieve a transformation of the raw composite into the desired shape and thickness for processing into the final product. Optionally, this can be followed by the cutting/forming into the desired end product shape and size through the utilization of a cutting die or rotary cutter or guillotine cutting system or extrusion die and cutter. The product is then transferred to any of the following systems: baking system, drying system, frying system, steaming system, boiling process, dehydration system, enrobing system, refrigeration system, freezing system, plating system, wrapping system, packaging system or any combination of such.

In certain preferred embodiments, the nutrient value, which is based on the mixture ratios of proteins, proteinaceous materials, fats, carbohydrates, and non-macronutrients to final product weight, can be modified for increased or decreased final nutritional levels as well as process-related functionality, product quality features, and desired end features. All are controlled through its ingredient ratio. Mixing of the ingredients is preferably accomplished by adding all components directly into a blender (single arm, double arm, ribbon, etc.) and mixing/blending until thoroughly integrated. The water percentage of the composite will need to be varied according to desired end product and method of processing. The final composite product will possess enough extensibility to be reduced to a solid sheet or molded item or extruded product or formed into select desired shape and size, utilizing the necessary equipment, without undesired attributes including adhesion to the reduction rollers, unable to structurally support its weight in process, lack of shaping in a molding system or extrusion unit, inability to be cut and/or shaped, and more. The final formed and sized and cut composite items are then processed through baking, drying, frying, steaming, boiling, or a combination of such, or frozen and/or packaged and/or packaged and refrigerated. The product is processed in this manner until the final item reaches the desired moisture percentage of less than 25%, with the preferred moisture content level being from 1% to 20%. The final moisture content can be between 2%-70%. Topical seasonings, icings, coatings and more can also be added for desired flavor.

The use of this functional controllable composite with existing equipment in a bakery, dough, pizza, extrusion, pasta, or snack food plant allows for high volume production of a product that is traditionally difficult to produce at economical processing costs.

Extensibility was evaluated for the nutritive edible composite materials. Extensibility is defined as the extent to which a material can be stretched without causing it to tear or break. It is measured as a percentage of the original product length extended from its unstretched shape. Products that are highly extensible will have the ability to stretch significantly and maintain full integrity. Low extensible products can only stretch a small amount before tearing/breaking. Low extensible products rely on cohesion for the limited amount of stretching.

The conclusion from the testing is that nutritive composites with the functional extensibility characteristic are achieved with proper functional material characteristics formulation and knowledge. These attributes are critical for the processing and creation of resulting final form nutritive products including bagels, loaf breads (all varieties), sliced breads (all varieties), pastries, pizzas, frozen dough items, refrigerated dough items, croissants, rolls, pasta (all varieties), snacks, chips, cereals, croutons, bread crumbs, flat breads (wraps, tortillas, taco shells), doughnuts, buns, and all created from extensible material.

In general, in one aspect the invention features a nutritive edible composite food product comprising one or more protein-containing materials, one or more carbohydrate-containing materials, one or more fats or fat-containing materials, and a source of liquid. The materials are mixed together to form an extensible nutritive edible composite material possessing an average extensibility of at least about 100%, such that the composite material is capable of being processed by extrusion, sheeting or molding operations that require extensibility. The composite material is further processed, to create a food product comprising at least about 15% protein.

More specific aspects of the invention can include one or more of the following. The edible composite food product may comprise from about 15% to about 40% protein. The composite material may possess an average extensibility of from about 100% to about 400%. The protein-containing material may comprise a wheat protein isolate, which may be a modified wheat protein isolate. The modified wheat protein isolate may be modified to achieve broken disulfide bonding providing a non-viscoelastic characteristic to the protein. The modified wheat protein isolate may be a wheat protein isolate with a carbohydrate content of no more than about 25%, ash content of no more than about 5%, and fat content of no more than about 5%. The modified wheat protein isolate may have an average molecular weight of less than 100,000. The modified wheat protein isolate may be refined and sodium metabisulfite-modified wheat gluten.

More specific aspects of the invention can include one or more of the following. The food product may comprise less than about 80% carbohydrate. The food product may comprise from about 3% to about 67% carbohydrate. The dough material may have a reduced carbohydrate profile of less than 70% of the dough by dry weight. The protein-containing material may comprise at least about 20% protein. The further processing may comprise a process selected from the group of processes consisting of direct reduction sheeting, lamination sheeting, molding, die cutting, dockering, baking, drying, rounding, forming, retort, freezing, fermentation, microwaving, frying, steaming, boiling, and extrusion. The food product may be a bread product, which may be selected from the group of bread products consisting of bread, rolls, croissants, buns, bagels, pizza crust, flat breads such as wraps, pastry, dough, bread crumbs and croutons. The food product may be selected from the group of food products consisting of chips, bars, snacks, crackers, wafers, flat breads, cookies, biscuits, breads, bagels, cakes, french fries, meat analogs, pasta, pastries, breakfast cereals, pancakes, waffles, pizza dough, muffins, doughnuts, dough, croissants, croutons, pretzels, rolls and buns. The food product may be a pasta product, or a snack chip product.

In general, in another aspect the invention features a method of creating a nutritive edible composite food product, comprising providing one or more protein-containing materials, providing one or more carbohydrate-containing materials, and providing one or more fats or fat-containing materials. The materials are mixed together to form an extensible nutritive edible composite material possesses an average extensibility of at least about 100%, such that the composite material is capable of being processed by extrusion, sheeting, rounding or molding operations that require extensibility. The composite material is then further processed to create a food product comprising at least about 15% protein. The composite material may possess an average extensibility of from about 100% to about 400%, and the food product may comprise from about 15% to about 40% protein, and up to about 80% carbohydrate. The food product may comprise greater than 25% by dry weight protein.

DETAILED DESCRIPTION

In one aspect the invention may be accomplished in a nutritive edible composite material with controllable extensibility when in raw hydrated form and resulting in a fabricated composite food in final form.

One embodiment of the invention comprises the following: mixing of a blend consisting of select protein(s), and other proteinaceous ingredients and/or concentrates and/or isolates, and/or fats and oils, and/or select carbohydrates, and/or flavors, and/or minerals, and/or seasoning, and/or micronutrients, and/or vitamins, and/or herbs, and/or extracts, and/or tinctures, and/or prebiotics, and/or probiotics, and/or yeast, and/or vegetable materials, and/or seeds, and/or nuts, and/or stimulants, and/or neuroactive compounds; the addition of water to the blend to form an extensible, cohesive composite material; optionally followed by further processing, such as the transfer of the solid composite mass to equilibrium holding and/or temperature controlled fermentation system and/or an extrusion process and/or reduction sheeting process and/or lamination sheeting, and/or molding system, and/or shaping system, and/or rounder, and/or cutting system. The composite material can then be still further processed via numerous alternative methods including but limited processes and combinations of fermentation, baking, drying, microwaving, frying steaming, boiling, molding, rounding, cutting, pressing, reduction sheeting, retort, lamination, freezing, refrigeration until the nutritive composite reaches the desired moisture percentage for the target resulting product followed by packaging of such. The final fabricated composite can also optionally be seasoned, flavored, layered, and/or enrobed or injected with seasoning and/or coating, and then packaged.

Twenty-five nutritive composites were designed via formulation, mixed, sheeted, and analyzed for extensibility in triplicate. Extensibility was measured using a TA-XT2 (Texture Technologies, Inc.). Nutritive composites were sheeted to 2 mm thickness and cut into 1 inch by 6 inch strips. Composite strips were held in a Tortilla Fixture rig (TA-108, Texture Technologies, Inc) and extensibility measured using a ball probe (d=0.5 inch). Speed was set at 1.7 mm/sec and total distance traveled before dough rupture was measured. Percent extensibility was calculated from the total distance traveled and the length of material that was tested.

The following tables illustrate the extensibility of the inventive nutritive composite materials that allow the raw composite material to be processed on everything from small to industrial-scale processing equipment designed for processing of carbohydrate-based products.

In each case for the several examples set forth herein, three different strips were tested, labeled "Ext1", "Ext2" and "Ext3." The averages of the three tests are reported in tables 1-3, as is the standard deviation. Note that since the material is a mixture of several nutritive foodstuff ingredients, most or all of which are natural or naturally-derived, there is some inherent inconsistency in the results; this is one reason that three tests were conducted and the average of the three reported. Also, the inherent variation (as supported by the variation among three test strips from the same batch of material, and the reported standard deviation) means that the numbers are inherently somewhat approximate and so cannot be determined exactly to within 1%, or perhaps even to within 5-10%. Thus, for example, an average of 398% (or, say an average of 408%) is approximately or about 400%, and an average of 103 or 106% (or, say 95%) is approximately or about 100%.

TABLE 1

| Example # | % Ext1 | % Ext2 | % Ext3 | Average % Extensibility | Std Dev |
|---|---|---|---|---|---|
| 1 | 414% | 381% | 401% | 398% | 17% |
| 2 | 312% | 276% | 303% | 297% | 19% |
| 3 | 289% | 270% | 276% | 279% | 10% |
| 4 | 276% | 260% | 271% | 269% | 8% |
| 5 | 183% | 244% | 239% | 221% | 34% |
| 6 | 316% | 278% | 381% | 325% | 52% |
| 7 | 307% | 259% | 249% | 272% | 31% |
| 8 | 216% | 291% | 339% | 281% | 62% |
| 9 | 261% | 267% | 289% | 273% | 15% |
| 10 | 245% | 325% | 254% | 275% | 44% |
| 11 | 189% | 185% | 196% | 190% | 5% |
| 12 | 196% | 208% | 183% | 195% | 13% |

TABLE 2

| Example # | % Ext1 | % Ext2 | % Ext3 | Average % Extensibility | Std Dev |
|---|---|---|---|---|---|
| 101 | 360% | 401% | 365% | 375% | 22% |
| 102 | 350% | 394% | 374% | 373% | 22% |
| 106 | 119% | 109% | 122% | 116% | 7% |
| 107 | 108% | 106% | 104% | 106% | 2% |
| 110 | 105% | 102% | 103% | 103% | 2% |
| 113 | 227% | 210% | 222% | 220% | 9% |

TABLE 3

| Example # | % Ext1 | % Ext2 | % Ext3 | Average % Extensibility | Std Dev |
|---|---|---|---|---|---|
| D1 | 360% | 402% | 279% | 347% | 63% |
| D2 | 300% | 273% | 311% | 295% | 19% |
| D3 | 379% | 394% | 396% | 390% | 9% |
| D4 | 406% | 367% | 399% | 391% | 21% |
| D5 | 360% | 388% | 374% | 374% | 14% |
| D6 | 281% | 325% | 336% | 314% | 29% |
| D7 | 386% | 403% | 417% | 402% | 16% |

The following tables illustrate the elongation of the inventive dough that allows it to be processed on small kitchen and industrial-scale food processing equipment designed for processing carbohydrate-based products.

The three doughs were prepared using the sodium metabisulfite, chemically modified, non-viscoelastic, film forming wheat protein isolate FP 5000 from Midwest Grain Products labeled "W". This product has 90% minimum protein (N×6.25), 4% maximum ash, 7% maximum moisture, 2% maximum fat, 1% maximum fiber, and 5% maximum starch. It has an average molecular weight of less than 100,000 Daltons. The doughs also include a common soy protein isolate Profam 781 from Archer Daniels Midland labeled "S", and a common vegetable oil labeled "0" and room temperature process water labeled "PW" under standard room temperature (70°-78° F.) conditions.

| Formulation | Break Elongation (%) |
|---|---|
| 11% W, 35% S, 14% O, 40% PW | 38.45 |
| 11% W, 35% S, 14% O, 40% PW | 35.73 |
| 11% W, 35% S, 14% O, 40% PW | 56.56 |
| 11% W, 35% S, 14% O, 40% PW | 25.23 |
| mean = 38.99 | |
| 23% W, 23% S, 14% O, 40% PW | 143.67 |
| 23% W, 23% S, 14% O, 40% PW | 81.19 |
| 23% W, 23% S, 14% O, 40% PW | 116.31 |
| mean = 113.72 | |
| control | |
| 0% W, 47% S, 14% O, 40% PW | 3.38 |
| 0% W, 47% S, 14% O, 40% PW | 4.21 |
| 0% W, 47% S, 14% O, 40% PW | 7.59 |
| 0% W, 47% S, 14% O, 40% PW | 5.73 |
| mean = 5.23 | |

As is evident, the use of at least 11% modified wheat protein isolate dramatically increases the break elongation functional characteristics of the proteinaceous dough, thus allowing it to have properties necessary for many industrial/commercial processes.

Note that in the following examples the amount of each ingredient is reported both as the number of parts and the percentage, both by weight. If the total number of parts is not equal to 100, these two numbers will not be the same. Also, the total amount of protein in the food product is reported to be between about 13% and about 76%, and the total amount of carbohydrates is reported to be between about 3% and about 67%, but can be up to about 80%. As the ingredients are subject to some inherent variability and in each case the amounts of the ingredients can be varied somewhat without substantially affecting the results, these amounts of protein are reported as varying from about or approximately 15% to about or approximately 75%, with a preferred range being from about 15% to about 40%, and the amount of carbohydrates can be up to about 80%.

Example 1

The following ingredients were measured and combined into a single arm mixer:

| | | |
|---|---|---|
| Wheat Protein Isolate | 100 | 35% |
| Soy Protein Isolate | 130 | 46.6% |
| Liquid Soy Lecithin | 10 | 3.6% |
| Vegetable Oil | 10 | 3.6% |
| Water | 24 | 8.6% |
| Potassium & Ammonia Bicarbonate Mix | 5 | 1.8% |

The nutritive composite mixture was thoroughly blended for six minutes and at the end was fully hydrated (due to the water in the mixture). The final extensible protein composite material or product was then transferred and sheeted to a thickness of 6 mm and die cut into rectangular shapes and transferred into to a convection oven, and baked for 10 minutes at temperatures of 330° F.

The nutritive composite had an average extensibility of 398% and the resulting fabricated food product was a snack cracker that possessed approximately 5% moisture, 75% protein, 10% fat, and 3% carbohydrate.

Example 2

The following ingredients were measured and combined into a large single arm mixer:

| | | |
|---|---|---|
| Milled Textured Wheat Protein | 40 | 15.7% |
| Wheat Protein Isolate | 80 | 31.3% |
| Soy Protein Isolate | 80 | 31.3% |
| Deactivated Yeast Protein | 10 | 3.9% |
| Pregelatinized Starch | 15 | 5.9% |
| Baking Soda | 5 | 2% |
| Soy Lecithin | 5 | 2% |
| Soy Lecithin Powder | 5 | 2% |
| Water | 15 | 5.9% |

The nutritive composite mixture was thoroughly blended for six minutes. The composite material was then sheeted to a thickness of approximately 2-4 mm and die cut into triangular chips and then placed on a baking tray and baked in a convection oven at 320° F. for approximately 5 minutes. The dried reduced moisture chips were then transferred to a deep fryer and fried in 360° F. vegetable oil for 2 minutes.

The nutritive composite material had an average extensibility of 297% and the resulting fabricated food product was a snack chip that possessed approximately 3% moisture, 56% protein, 25% fat, and 10% carbohydrates.

Example 3

The following ingredients were measured and combined into a large single arm mixer:

| | | |
|---|---|---|
| Textured Wheat Protein Powder | 80 | 11% |
| Modified Wheat Protein Isolate | 220 | 30.1% |
| Soy Protein Isolate | 140 | 19.2% |
| Lecithin Powder | 10 | 1.4% |
| Vegetable Oil | 30 | 4.1% |
| Water | 250 | 34.2% |

The nutritive composite mixture was thoroughly blended for six minutes. The composite was then sheeted to a thickness of approximately 2-4 mm and die cut into triangular chips and then placed on a sheet pan and baked in a convection oven at 320° F. for approximately 10 minutes.

The nutritive composite material had an average extensibility of 279% and the resulting fabricated food product was a snack chip that possessed approximately 4% moisture, 76% protein, 8% carbohydrate, and 8% fat.

Example 4

The following ingredients were measured and combined into a large single arm mixer:

| | | |
|---|---|---|
| Textured Wheat Protein Powder | 80 | 11% |
| Modified Wheat Protein Isolate | 220 | 30.1% |
| Soy Protein Isolate | 140 | 19.2% |
| Lecithin Powder | 10 | 1.4% |
| Vegetable Oil | 30 | 4.1% |
| Water | 250 | 34.2% |

The nutritive composite mixture was thoroughly blended for six minutes. The composite was then sheeted to a thickness of approximately 2-4 mm and die cut into triangular chips and then placed on a baking tray and baked in a convection oven at 320° F. for approximately 5 minutes. The dried reduced moisture chips were then transferred to a deep fryer and fried in 360° F. vegetable oil for 2 minutes.

The nutritive composite material had an average extensibility of 269% and the resulting fabricated food product was a snack chip that possessed approximately 3% moisture, 54% protein, 25% fat, and 4% carbohydrate.

Example 5

The following ingredients were measured and combined into a large single arm mixer:

| | | |
|---|---|---|
| Textured Wheat Protein Powder | 40 | 12.7% |
| Wheat Protein Isolate | 110 | 35% |
| Soy Protein Isolate | 70 | 22.2% |
| Deactivate Yeast Protein | 20 | 6.3% |
| Leavening Agent | 5 | 1.6% |
| Vegetable oil | 50 | 15.9% |
| Lecithin | 5 | 1.6% |
| Water | 15 | 4.8% |

The nutritive composite mixture was thoroughly blended for six minutes. The composite was then sheeted to a thickness of approximately 2-4 mm and die cut into triangular chips and then placed on a sheet pan and baked in a convection oven at 320° F. for approximately 10 minutes.

The nutritive composite material had an average extensibility of 221% and the resulting fabricated food product was a snack chip that possessed approximately 2% moisture, 71% protein, 20% fat, and 8% carbohydrates.

Example 6

The following ingredients were measured and combined into a large single arm mixer:

| | | |
|---|---|---|
| Wheat Gluten | 50 | 21.6% |
| Wheat Protein Isolate | 30 | 12.9% |
| Soy Protein Concentrate | 20 | 8.6% |
| Deactivated Yeast Protein | 1 | 0.4% |
| Potato Granules | 100 | 43.1% |
| Sodium Bicarbonate | 5 | 2.6% |
| Soy Lecithin | 5 | 2.6% |
| Soy Lecithin Powder | 5 | 2.6% |
| Water | 16 | 6.9% |

The nutritive composite mixture was thoroughly blended for six minutes. The composite material or product was then sheeted and die cut into french fries. The product was then allowed to equilibrate in a drying oven and then transferred to a deep fryer and fried in 360° F. vegetable oil for 3-4 minutes.

The nutritive composite material had an average extensibility of 325% and the resulting fabricated food product was a french fry that possessed approximately 5% moisture, 29% protein, 23% fat, 29% carbohydrates.

Example 7

The following ingredients were measured and combined into a large single arm mixer:

| | | |
|---|---|---|
| Wheat Gluten | 50 | 19.9% |
| Wheat Protein Isolate | 30 | 11.9% |
| Soy Protein Concentrate | 50 | 19.9% |
| Yeast Protein Powder | 0.5 | 0.2% |
| Corn Masa | 100 | 39.8% |
| Soy Lecithin | 5 | 2.0% |
| Water | 16 | 6.4% |

The nutritive composite mixture was thoroughly blended for six minutes. The composite material was then put into an extruder and extruded into a snack chip and transferred to a deep fryer and fried in 360° F. canola oil for 4 minutes.

The nutritive composite material had an average extensibility of 272% and the resulting fabricated food product was a corn snack chip with a composition of approximately 3% moisture, 32% protein, 25% fat, 28% carbohydrates.

Example 8

The following ingredients were measured and combined into a large single arm mixer:

| | | |
|---|---|---|
| Wheat Gluten | 50 | 22.5% |
| Wheat Protein Isolate | 30 | 13.5% |
| Soy Protein Concentrate | 20 | 9.0% |
| Deactivated Yeast Protein | 1 | 0.45% |
| Potato Granule | 100 | 45% |
| Sodium Bicarbonate | 5 | 2.25% |
| Water | 16 | 7.2% |

The nutritive composite mixture was thoroughly blended for six minutes. The composite material was then sheeted and die cut into a snack chip and transferred to a deep fryer after equilibrium period and fried in 360° F. canola oil for 4 minutes.

The nutritive composite material had an average extensibility of 281% and the resulting fabricated food product was a potato chip with a composition of approximately 3% moisture, 29% protein, 25% fat, 29% carbohydrates.

Example 9

The following ingredients were measured and combined into a large single arm mixer:

| Textured Wheat Protein Powder | 140 | 8% |
| --- | --- | --- |
| Wheat Protein Isolate | 360 | 20.6% |
| Soy Protein Isolate | 396 | 22.6% |
| Lecithin | 40 | 2.3% |
| Safflower Oil | 40 | 2.3% |
| Flavor | 4 | 0.2% |
| Water | 750 | 42.9% |

The nutritive composite mixture was thoroughly blended for six minutes. The extensible protein composite product was then transferred a vertical lamination/sheeting unit and sheeted to a thickness of approximately 1 mm and die cut into potato chip shaped chips. The cut chips were then transferred to a direct fire 275° oven and baked for 2.40 minutes at temperatures ranging from 250 to 485° F. The baked product was then further dried in a radio frequency drying oven followed by topical oiling and seasoning.

The nutritive composite material had an average extensibility of 273% and the resulting fabricated food product was a snack chip that possessed approximately 2% moisture, 64% protein, 18% fat, 11% carbohydrates.

Example 10

The following ingredients were measured and combined into a large single arm mixer:

| Textured Wheat Protein Powder | 7 | 18.8% |
| --- | --- | --- |
| Wheat Protein Isolate | 7 | 18.8% |
| Whey Protein Concentrate | 11 | 29.6% |
| Soy Lecithin | 1 | 2.7% |
| Rice Bran Oil | 1 | 2.7% |
| Ammonia Bicarbonate | 0.1 | 0.3% |
| Prebiotic & Probiotic Mix | 0.1 | 0.3% |
| Water | 10 | 26.9% |

The nutritive composite mixture was thoroughly blended for six minutes. The final extensible protein composite product was then transferred a sheeting machine and reduced to a thickness of approximately 10 mm and die cut into rectangular cookie bar products. The cut bars were then transferred to a convection oven and baked for 7 minutes at temperatures ranging from 250 to 485° F. The final baked product was then enrobed in compound chocolate.

The nutritive composite material had an average extensibility of 275% and the resulting fabricated food product was a nutritive cookie bar/biscotti that possessed approximately 4% moisture, 67% protein, 17% fat, 13% carbohydrates.

Example 11

The following ingredients were measured and combined into a large single arm mixer:

| Wheat Protein Isolate | 7 | 23.2% |
| --- | --- | --- |
| Whey Protein Concentrate | 14 | 46.4% |
| Soy Lecithin | 1 | 3.3% |
| Rice Bran Oil | 1 | 3.3% |
| Ammonia Bicarbonate | 0.1 | 0.33% |
| Herbal Tincture | 0.1 | 0.33% |
| Water | 7 | 23.2% |

The nutritive composite mixture was thoroughly blended for six minutes. The composite was then put into an extruder and extruded into a snack chip and transferred to a to a sheet pan and then baked in a convection oven for 7 minutes for a timed bake cycle at temperatures ranging from 250 to 485° F. The final product was tumbled and packaged as a flavored snack.

The nutritive composite material had an average extensibility of 190% and the resulting fabricated food product was a snack with a composition of approximately 3% moisture, 75% protein, 7% fat, 11% carbohydrates.

Example 12

The following ingredients were measured and combined into a large single arm mixer:

| Wheat Protein Isolate | 3 | 5.1% |
| --- | --- | --- |
| Textured Wheat Protein | 10 | 17% |
| Casein | 11 | 18.7% |
| Water | 6.5 | 11.1% |
| Rice Bran Oil | 2 | 3.4% |
| Soy Lecithin | 2 | 3.4% |
| Sucralose ® | 0.2 | 0.3% |
| Emulsifying Agent | 0.10 | 0.2% |

The nutritive composite mixture was thoroughly blended for six minutes. The final extensible protein composite product was then transferred to a sheeter with a dockered UHMW (ultra-high molecular weight) polymeric die mold where the composite was molded and cut into bars. The bars were then placed on a sheet pan and baked in a convection oven at 350 degrees for 10 minutes. The bars were then transferred to drying oven at 250 degrees for final moisture removal.

The nutritive composite material had an average extensibility of 195% and the resulting fabricated food product was a molded bar with a composition of approximately 72% protein, 6% carbohydrate, and 12% fat.

Example 101

The following ingredients were measured and combined into a large single arm mixer:

| Water | 45.5 | 45.5% |
| --- | --- | --- |
| Wheat Flour | 36.7 | 36.7% |
| Soy Protein Isolate | 4.7 | 4.7% |
| Wheat Protein Isolate | 3.6 | 3.6% |
| Soy Lecithin | 3.6 | 3.6% |
| Safflower Oil | 3.6 | 3.6% |
| Ammonia Bicarbonate | 1.8 | 1.8% |

The nutritive composite mixture was thoroughly blended for six minutes. The final extensible protein composite product was then placed into a forming and rounding machine where it was formed into balls, packaged, and frozen.

The nutritive composite material had an average extensibility of 375% and the resulting fabricated product was a frozen dough ball with a composition of approximately 16% protein, 27% carbohydrate, 9% fat and 46% moisture. The dough balls fabricated herein can be used as would be any traditional high-carbohydrate dough, such as in breads, rolls, pizza crust and the like, such products further described herein.

Example 102

The following ingredients were measured and combined into a large single arm mixer:

| Wheat Flour | 43.1 | 43.1% |
| Water | 35.4 | 35.4% |
| Cornstarch | 4.6 | 4.6% |
| Textured Wheat Protein Powder | 3.0 | 3.0% |
| Wheat Protein Isolate | 3.1 | 3.1% |
| Yeast | 3.1 | 3.1% |
| Soy Protein Isolate | 3.1 | 3.1% |
| Baking Powder | 1.5 | 1.5% |
| Lecithin, granules | 1.5 | 1.5% |
| Soy Lecithin | 1.5 | 1.5% |

The nutritive composite mixture was thoroughly blended for six minutes. The final extensible protein composite product was then placed into a forming and rounding machine where it was formed into balls, packaged, and frozen.

The nutritive composite material had an average extensibility of 373% and the resulting fabricated product was a frozen dough ball with a composition of approximately 16% protein, 43% carbohydrate, 4% fat and 35% moisture.

Example 106

The following ingredients were measured and combined into a large single arm mixer:

| Water | 44.0 | 44.0% |
| Potato granules | 38.3 | 38.3% |
| Wheat Protein Isolate | 7.7 | 7.7% |
| Soy Protein, Concentrate | 3.8 | 3.8% |
| Lecithin, granules | 1.9 | 1.9% |
| Baking Powder | 1.9 | 1.9% |
| Soy Lecithin | 1.9 | 1.9% |
| Yeast | 0.4 | 0.4% |

The nutritive composite mixture was thoroughly blended for six minutes. The final extensible protein composite product was then placed into a forming and rounding machine where it was formed into balls, packaged, and refrigerated.

The nutritive composite material had an average extensibility of 116% and the resulting fabricated product was a refrigerated dough ball with a composition of approximately 13% protein, 37% carbohydrate, 4% fat and 44% moisture.

Example 107

The following ingredients were measured and combined into a large single arm mixer:

| Corn Masa, vitamin enriched | 49.9 | 49.9% |
| Water | 38.2 | 38.2% |
| Wheat Protein Isolate | 6.6 | 6.6% |
| Soy Protein Concentrate | 3.3 | 3.3% |
| Soy Lecithin | 1.7 | 1.7% |
| Yeast | 0.2 | 0.2% |

The nutritive composite mixture was thoroughly blended for six minutes. The final extensible protein composite product was then formed into balls and pressed into individual tortillas.

The nutritive composite material had an average extensibility of 106% and the resulting fabricated food product was a tortilla and possessed a composition of approximately 15% protein, 49% carbohydrate, 5% fat and 29% moisture.

Example 110

The following ingredients were measured and combined into a large single arm mixer:

| Potatoes granules | 59.8 | 59.8% |
| Water | 21.9 | 21.9% |
| Whey Protein Concentrate | 9.9 | 9.9% |
| Wheat Protein Isolate | 3.9 | 3.9% |
| Lecithin, granules | 2.0 | 2.0% |
| Safflower Oil | 2.0 | 2.0% |
| Sucralose | 0.2 | 0.2% |

The nutritive composite mixture was thoroughly blended for six minutes. The final extensible protein composite product was then placed into a forming and rounding machine where it was formed into balls, packaged, and refrigerated.

The nutritive composite had an average extensibility of 103% and the resulting fabricated product was a refrigerated dough ball with a composition of approximately 18% protein, 53% carbohydrate, 4% fat and 22% moisture.

Example 113

The following ingredients were measured and combined into a large single arm mixer:

| Wheat Flour | 37.8 | 37.8% |
| Water | 31.1 | 31.1% |
| Sugar | 10.8 | 10.8% |
| Cocoa Powder | 5.4 | 5.4% |
| Textured Wheat Protein Powder | 2.7 | 2.7% |
| Wheat Protein Isolate | 2.7 | 2.7% |
| Vitamin Mix | 2.7 | 2.7% |
| Soy Protein Isolate | 2.7 | 2.7% |
| Baking Powder | 1.4 | 1.4% |
| Lecithin, granules | 1.4 | 1.4% |
| Soy Lecithin | 1.4 | 1.4% |

The nutritive composite mixture was thoroughly blended for six minutes. The final extensible protein composite product was then placed into an extruder and extruded/cut into pieces and then dried.

The nutritive composite material had an average extensibility of 220% and the resulting fabricated food product was a cereal with a composition of approximately 21% protein, 67% carbohydrate, 4% fat and 4% moisture.

Example D1

The following ingredients were measured and combined into a large single arm mixer:

| | | |
|---|---|---|
| Wheat Flour | 10300 | 35.8% |
| Milk Protein Isolate | 2000 | 6.9% |
| Gluten | 1600 | 5.5% |
| Wheat Protein Isolate | 1300 | 4.6% |
| Salt | 200 | 0.7% |
| Butter | 2600 | 9.0% |
| Water | 10200 | 35.4% |
| Yeast | 600 | 2.1% |

The nutritive composite mixture was thoroughly blended for six minutes. The composite material was then transferred to a fermentation-proofing unit and allowed to ferment at 90° F. with 80% humidity for 20 minutes. Upon completion, the batch was transferred to an automated uniform bagel forming machine. The nutritive bagels were formed and then baked in a large rotary convection oven for 13 minutes with 15 seconds of steam at 270° F.

The nutritive composite material had an average extensibility of 347% and the resulting fabricated product was a bagel that possessed about 19% protein, 29% carbohydrate, 9% fat and 40% moisture.

Example D2

The following ingredients were measured and combined into a large single arm mixer:

| | | |
|---|---|---|
| Wheat Flour | 265 | 18.5% |
| Whole Wheat Flour | 200 | 14.0% |
| Oat Flour | 25 | 1.8% |
| Rye Flour | 25 | 1.8% |
| Milk Protein Isolate | 100 | 7.0% |
| Gluten | 80 | 5.6% |
| Wheat Protein Isolate | 65 | 4.6% |
| Salt | 10 | 0.7% |
| Butter | 130 | 9.0% |
| Water | 500 | 35.0% |
| Yeast | 30 | 2.1% |

The nutritive composite mixture was thoroughly blended for six minutes. The composite was then transferred to a fermentation-proofing unit and allowed to ferment at 90° F. with 80% humidity for 20 minutes. Upon completion, the batch was transferred to a dividing and rounding machine. The nutritive composite balls were formed and then baked in a large rotary convection oven for 13 minutes at 270° F.

The nutritive composite material had an average extensibility of 295% and the resulting fabricated food product was a sandwich roll that possessed about 19% protein, 29% carbohydrate, 9% fat and 39% moisture.

Example D3

The following ingredients were measured and combined into a large single arm mixer:

| | | |
|---|---|---|
| Wheat Flour | 515 | 37.5% |
| Milk Protein Isolate | 100 | 7.3% |
| Gluten | 80 | 5.8% |
| Wheat Protein Isolate | 65 | 4.8% |
| Salt | 10 | 0.7% |
| Butter | 65 | 4.7% |
| Water | 510 | 37.1% |
| Yeast | 30 | 2.2% |

The nutritive composite mixture was thoroughly blended for seven minutes. The composite material was then transferred to a fermentation-proofing unit and allowed to ferment at 90° F. with 80% humidity for 20 minutes. Upon completion, the batch was converted into loafs. The nutritive composite loafs were placed into loaf trays and then baked in a large rotary convection oven for 26 minutes at 260° F.

The nutritive composite material had an average extensibility of 390% and the resulting fabricated food product was a bread loaf that possessed about 21% protein, 31% carbohydrate, 5% fat and 40% moisture.

The nutritive bread loaves were then refrigerated to create a firm structure and then cut into small crouton cubes and then oiled and seasoned in an automated tumbling machine and baked again at 280° F. for 20 minutes.

The nutritive croutons possessed about 31% protein, 46% carbohydrate, 16% fat and 3% moisture.

Example D4

The following ingredients were measured and combined into a large single arm mixer:

| | | |
|---|---|---|
| Wheat Flour | 515 | 38.7% |
| Milk Protein Isolate | 100 | 7.5% |
| Gluten | 80 | 6.0% |
| Wheat Protein Isolate | 65 | 4.8% |
| Salt | 10 | 0.8% |
| Butter | 20 | 1.5% |
| Water | 510 | 38.4% |
| Yeast | 30 | 2.3% |

The nutritive composite mixture was thoroughly blended for six minutes. The composite was then transferred to a fermentation-proofing unit and allowed to ferment at 90° F. with 80% humidity 20 minutes. Upon completion, the batch was transferred to an automated sheeting and forming machine line. The nutritive loaves were formed and then baked in a large rotary convection oven for 25 minutes at 270° F. in specialty locking loaf molds.

The nutritive composite material had an average extensibility of 391% and the resulting fabricated food product was a bread loaf that possessed about 25% protein, 34% carbohydrate, 2% fat and 40% moisture.

The nutritive loaves were then refrigerated to create a firm structure and sliced on an automated slicer to 5-8 mm and then oiled and seasoned in an automated tumbling machine and baked again at 250° F. for 15 minutes which yielded nutritive chips that possessed about 31% protein, 46% carbohydrate, 16% fat and 3% moisture.

Example D5

The following ingredients were measured and combined into a large single arm mixer:

| | | |
|---|---|---|
| Wheat Flour | 515 | 32.8% |
| Milk Protein Isolate | 100 | 6.4% |
| Gluten | 80 | 5.1% |
| Wheat Protein Isolate | 65 | 4.2% |
| Salt | 10 | 0.6% |

-continued

| | | |
|---|---|---|
| Butter | 130 | 8.3% |
| Water | 640 | 40.8% |
| Yeast | 30 | 1.9% |

The nutritive composite mixture was thoroughly blended for six minutes. The composite material was then transferred to a fermentation-proofing unit and allowed to ferment at 90° F. with 80% humidity for 20 minutes. Upon completion, the batch was divided into thirds. The nutritive composite material had an average extensibility of 374%.

Composite part 1 was moved to an automated uniform flat bread pressing machine. The nutritive composite was formed into flat bread in a heated (325° F.) double plate press for 9 seconds and then baked in a large rotary convection oven for 13 minutes with 15 seconds of steam at 270° F.

Composite part 2 was formed into balls and frozen. The final product was frozen pizza dough balls.

Composite part 3 was formed into pizza crusts. The crusts were then covered in a tomato sauce and various micronutrients and probiotics followed by low moisture cheese. The nutritive composite was then baked in a large open flame rotating high temperature oven at 525° F. for 7 minutes.

The final resulting fabrication is a nutritive pizza with a composition of about 19% protein, 22% carbohydrate, 10% fat, 47% moisture along with minerals and probiotics.

Example D6

The following ingredients were measured and combined into a large single arm mixer:

| | | |
|---|---|---|
| Wheat Flour | 265 | 18.4% |
| Whole Wheat Flour | 200 | 13.9% |
| Oat Flour | 25 | 1.7% |
| Rye Flour | 25 | 1.7% |
| Milk Protein Isolate | 50 | 3.5% |
| Pea Protein Isolate | 50 | 3.5% |
| Gluten | 80 | 5.6% |
| Wheat Protein Isolate | 65 | 4.6% |
| Mineral Complex | 10 | 0.7% |
| Butter | 130 | 9.0% |
| Water | 500 | 34.7% |
| Yeast | 40 | 2.8% |

The nutritive composite mixture was thoroughly blended for six minutes. The composite was then transferred to a fermentation-proofing unit and allowed to ferment at 90° F. with 80% humidity for 20 minutes. Upon completion, the batch was transferred to sheeting line where it was converted into croissants. The nutritive croissants were formed and then baked in a large rotary convection oven for 13 minutes with 15 seconds of steam at 270° F.

The nutritive composite material had an average extensibility of 314% and the resulting fabricated food product was a croissant that possessed about 21% protein, 31% carbohydrate, 5% fat and 40% moisture.

Example D7

The following ingredients were measured and combined into a large single arm mixer:

| | | |
|---|---|---|
| Wheat Flour | 515 | 38.7% |
| Milk Protein Isolate | 100 | 7.5% |
| Gluten | 80 | 6.0% |
| Wheat Protein Isolate | 65 | 4.8% |
| Salt | 10 | 0.8% |
| Butter | 20 | 1.5% |
| Water | 500 | 37.6% |
| Yeast | 20 | 1.5% |
| Lecithin | 20 | 1.5% |

The nutritive composite mixture was thoroughly blended for six minutes. The composite material was then transferred to a fermentation-proofing unit and allowed to ferment at 90° F. with 80% humidity for 20 minutes. Upon completion, the batch was transferred to sheeting line and sheeted and cut into squares where a mix of sweetened cinnamon and butter was applied to the dough and it was formed into buns. The product was then baked in a convection oven for 8 minutes at 270° F.

The nutritive composite material had an average extensibility of 402% and the resulting fabricated food product was a cinnamon bun that possessed about 21% protein, 31% carbohydrate, 5% fat and 40% moisture.

Table of Certain Ingredients and Their Commercial Sources

| Ingredient | Manufacturer |
|---|---|
| Dominator Wheat Flour | Archer Daniels Midland |
| Milk Protein Isolate - MPI 490 | New Zealand Milk Products |
| Gluten | Archer Daniels Midland |
| Wheat Protein Isolate - Prolite 100 | Archer Daniels Midland |
| Wheat Protein Isolate - Prolite 200 | Archer Daniels Midland |
| Soy Lecithin, Powder | Archer Daniels Midland |
| Lecithin, Liquid | Archer Daniels Midland |
| Soy Protein Isolate, Profam 781 | Archer Daniels Midland |
| Oat Flour | Grain Millers Inc |
| Whole Wheat Flour | Veribest |
| Rye Flour | Veribest |
| Oil, High Oleic Safflower | Columbus Oils |
| Pea Protein Isolate - Nutralys F85M | Roquette |
| Probiotic BC30 | Ganeden Biotech |
| Yeast, Baking | Red Star |
| Sucralose | Tate & Lyle |
| Wheat Protein Isolate - FP 5000 & 6000 | MGP |
| Texturized Wheat Protein Powder | MGP |

Each of the above features of the invention may be combined within the scope of the invention as understood by those skilled in the art. Other embodiments will occur to those skilled in the art and are within the scope of the following claims.

What is claimed is:

1. A nutritive edible composite food product, comprising:
   a protein-containing ingredient comprising modified wheat protein isolate;
   a fat ingredient comprising a percent fat greater than 33% measured on a dry basis; and
   a liquid ingredient;
   wherein the ingredients are mixed together to form an extensible composite material, the extensible composite material possessing an average extensibility of from about 100% to about 400% such that the composite material can be processed by extrusion, sheeting or molding operations that require extensibility; and
   wherein the processed composite material is a nutritive edible composite product comprising greater than 25% protein and less than 25% moisture.

2. The nutritive edible composite food product of claim 1 wherein the modified wheat protein isolate is modified to achieve broken disulfide bonding providing a non-viscoelastic characteristic to the protein.

3. The nutritive edible composite food product of claim 1 wherein the modified wheat protein isolate is a wheat protein isolate with a carbohydrate content of no more than 25%, ash content of no more than 5%, and fat content of no more than 5%.

4. The nutritive edible composite food product of claim 1 wherein the modified wheat protein isolate has an average molecular weight of less than 100,000.

5. The nutritive edible composite food product of claim 1 wherein the modified wheat protein isolate is refined and sodium metabisulfite-modified wheat gluten.

6. The nutritive edible composite food product of claim 1 wherein the composite material further comprises less than about 80% carbohydrate.

7. The nutritive edible composite food product of claim 6 wherein the composite material further comprises less than 70% carbohydrate by dry weight.

8. The nutritive edible composite food product of claim 1 wherein the processing of the composite material comprises a process selected from the group of processes consisting of direct reduction sheeting, lamination sheeting, molding, die cutting, dockering, baking, drying, rounding, forming, retort, freezing, fermentation, microwaving, frying, steaming, boiling, and extrusion.

9. The nutritive edible composite food product of claim 1 wherein the food product is a bread product.

10. The nutritive edible composite food product of claim 9 wherein the bread product is selected from the group of bread products consisting of bread, rolls, croissants, buns, bagels, pizza crust, flat bread, pastry, dough, bread crumbs and croutons.

11. The nutritive edible composite food product of claim 1 wherein the food product is selected from the group of food products consisting of chips, bars, snacks, crackers, wafers, flat breads, cookies, biscuits, breads, bagels, cakes, french fries, meat analogs, pasta, pastries, breakfast cereals, pancakes, waffles, pizza dough, muffins, doughnuts, dough, croissants, croutons, pretzels, rolls and buns.

12. The nutritive edible composite food product of claim 1 wherein the food product is a pasta product.

13. The nutritive edible composite food product of claim 1 wherein the food product is a snack chip product.

14. A method of creating a nutritive edible composite food product, comprising the steps of:
mixing a protein-containing ingredient comprising modified wheat protein isolate;
a fat ingredient comprising a percent fat greater than 33% measured on a dry basis; and
a liquid ingredient;
to form an extensible composite material, the extensible composite material possessing an average extensibility of from about 100% to about 400% such that the composite material can be processed by extrusion, sheeting or molding operations that require extensibility; and
wherein the processed composite material is a nutritive edible composite product comprising greater than 25% protein and less than 25% moisture.

15. The method of claim 14 wherein the food product comprises less than 70% carbohydrate by dry weight.

16. A nutritive edible composite food product, comprising:
a protein-containing ingredient comprising modified wheat protein isolate;
a fat ingredient comprising a percent fat greater than 33% measured on a dry basis; and
a liquid ingredient;
wherein the ingredients are mixed together to form an extensible composite material, the extensible composite material exhibiting a sufficiently high break elongation such that the extensible composite material can be processed by extrusion, sheeting or molding operations that require extensibility; and
wherein the processed composite material is a nutritive edible composite product comprising greater than 25% protein and less than 25% moisture.

* * * * *